Sept. 24, 1968 W. DRAPKIN 3,403,217
CAPTIVE MOUNTING SCREW PARTICULARLY FOR ELECTRICAL
WIRING DEVICE MOUNTING STRAPS
Filed June 29, 1967
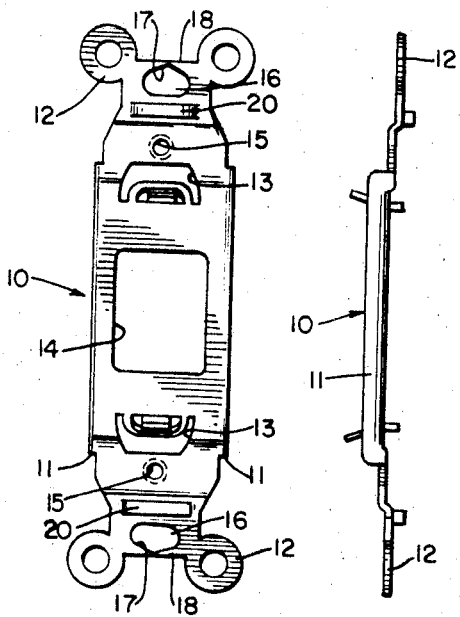
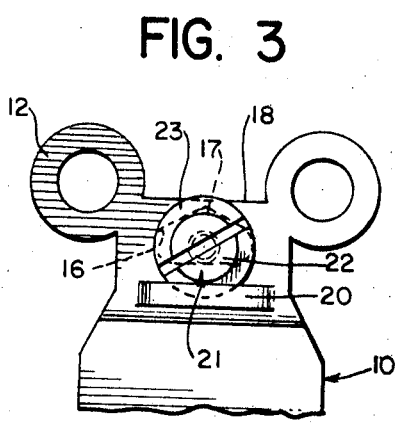
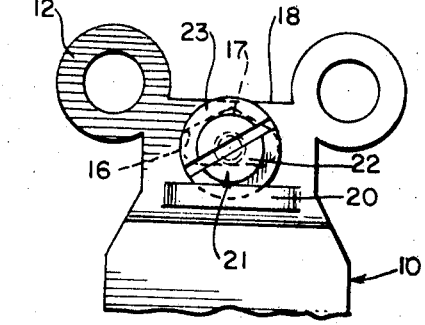
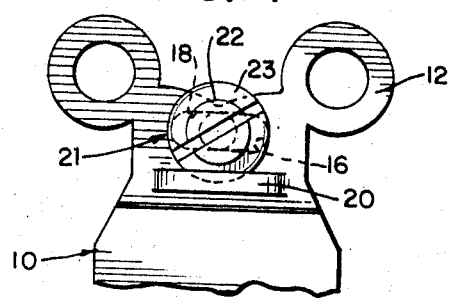
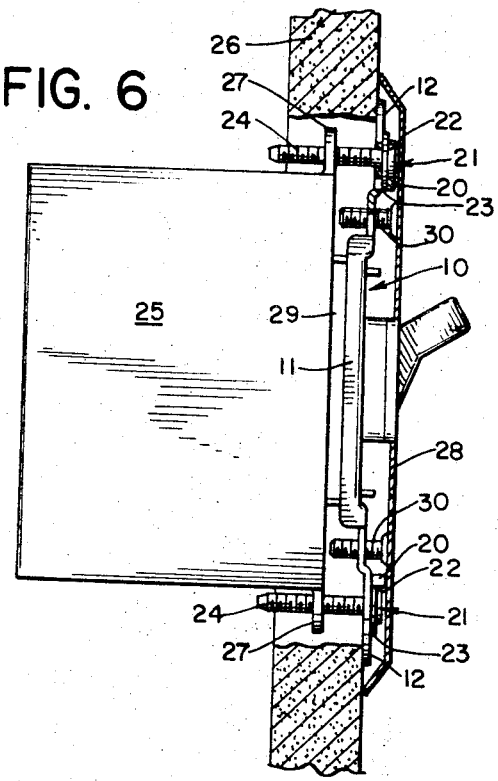
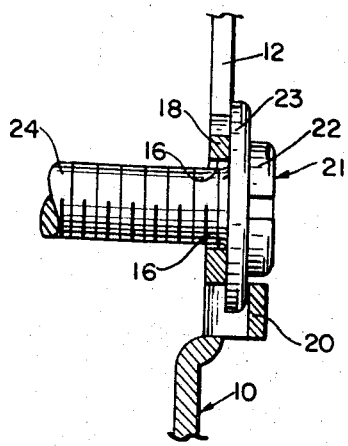
INVENTOR
WILLIAM DRAPKIN
BY Darby+Darby
ATTORNEYS United States Patent Office 3,403,217
Patented Sept. 24, 1968

3,403,217
CAPTIVE MOUNTING SCREW PARTICULARLY FOR ELECTRICAL WIRING DEVICE MOUNTING STRAPS
William Drapkin, Brooklyn, N.Y., assignor to Slater Electric Inc., Glen Cove, N.Y., a corporation of New York
Filed June 29, 1967, Ser. No. 650,125
2 Claims. (Cl. 174—53)

ABSTRACT OF THE DISCLOSURE

The disclosure herein describes a mounting screw which is held captive in the mounting strap of an electrical wiring device by cooperation between a large washer-type head on the screw and a U-shaped portion bent up from the strap and overlying a portion of the large screw head.

---

Although not limited to use with electrical wiring devices and the usual mounting straps therefor, the present device finds a very practical use in such devices and is therefore described hereinafter in connection with such use.

At the present time, electrical wiring devices such as switches and plug receptacles are shipped to the customer with mounting screws located in apertures in the mounting strap and held in position in these apertures by the use of metal or fibre washers which are threaded onto the screws. This arrangement has a number of drawbacks, one of which is that the cost of threading the washers on the screws is relatively high; the second of which is that particularly in the case of the fibre washers there is no contact between the mounting strap and the grounded outlet box in which the electrical wiring device is located, other than the contact produced by the screw head. Even when metal washers are used, the contact is in many instances limited, since not infrequently the outlet box is recessed so that the mounting strap overlies plaster or plasterboard and again the only grounding contact of the strap to the box is produced by contact of the screw head with the strap aperture. This situation is normally aggravated, since the common mounting screw is one with a flat head having the usual beveled undersurface so that there is actually but a line of contact, which is not an effective electrical ground.

The present invention, as has been indicated above, eliminates the situation referred to, since the screw head is large and provides adequate contact with the strap so that a good electrical ground is assured. At the same time a means is provided for holding the screw captive in the strap, which means does not require a retaining washer to be threaded on the screw at the rear of the strap aperture, and which is much less expensively performed than is the threading of such washers.

Various objects and features of the invention will become apaprent when the following description is considered in connection with the annexed drawings in which:

FIGURE 1 is a front-elevational view of a mounting strap in accordance with the present invention prior to the insertion and capturing of the mounting screw therein;

FIGURE 2 is a side-elevational view of the mounting strap of FIGURE 1;

FIGURE 3 is an enlarged front-elevational view of one end of the mounting strap of FIGURE 1, showing a screw placed in the aperture of the mounting strap, but prior to the capturing thereof;

FIGURE 4 is a view similar to FIGURE 3, but showing the mounting strap end in position capturing the screw;

FIGURE 5 is a vertical cross-sectional view of the mounting strap end and the screw assembly of FIGURE 4, and FIGURE 6 is a transverse cross-sectional view of a plaster wall showing an outlet box in position with an electrical switch mounted therein by means of the mounting strap and captive screw of this invention.

Referring now to the drawings and particularly to FIGURES 1 and 2, it will be seen that the strap 10 is of a form which is common for the mounting of electrical wiring devices such as switches and outlets, and comprises mounting ears 11, portions 12 of which are adapted to overlie the plaster in those instances in which the outlet box is recessed from the face of the plaster wall and which may be broken off if desired in the event that the box is flush with the wall surface. It also includes the stamped-out openings 13 forming lugs which are bent over and engage projections on the housing of the switch or outlet to hold such device in position on the strap.

Additionally, the strap is provided with a central opening 14 through which the switch handle extends, and with the threaded openings 15 which are utilized for mounting a wall plate on the mounting strap 10 after the strap and the switch or other device carried thereby has been mounted in an outlet box.

The above description of the mounting strap is purely for purposes of illustration, since many different forms of mounting straps are in use and the present invention is applicable to any of the strap configurations which are currently in use.

In accordance with the invention, the usual oval apertures 16 are modified so that they have an upwardly extending portion 17, the upper side of the opening 16 thus being generally triangular, with the apex of the triangle lying relatively close to the outer edge 18 of the strap. Also, inwardly from the opening 16 there is provided a bent-up U-shaped strip portion 20 which is spaced above the surface of the mounting plate, leaving an opening which, as will be described hereinafter, is adapted to receive the washer head of a screw.

Referring now to FIGURES 3, 4, and 5, there is shown therein a screw 21 having a head consisting of a usual slotted portion 22 beneath which is an enlarged washer-like portion 23, the washer 23 beig integral with the head 22, both of course being integral with the screw body 24 (See FIG. 5).

As will be seen, the screw 21 may be inserted through the opening 16, 17 with the washer 23 clearing the upper edge of the strip portion 20, by virtue of the fact that the triangular portion 17 of the opening 16 provides sufficient vertical dimension to permit this clearance. After the screw has been inserted, the edge portion 18 of the strap is bent downwardly to the position indicated in FIGURE 4, thus causing the washer portion 22 of the screw 23 to lie in the opening between the face of the strap 10 and the undersurface of strip 20. The screw 21 is thus held in position on the strap and moreover, as indicated above, the large washer-type head seats firmly against the face of the strap when the screw is tightened during the mounting of the wiring device, thus assuring that the electrical connection between the box, the strap, and the wiring device (which is electrically connected to the strap) will be proper and the device thus electrically grounded.

The device is shown in use in FIGURE 6, in which figure an outlet box is indicated at 25, the box being in this case mounted in the position where it is not entirely flush with the surface of the plaster wall 26. As is clear from this view, the screws 24 are threaded into the mounting ears 27 of the outlet box 25 and are caused to be pressed against the face of the strap 10, thus assuring a good electrical ground as mentioned hereinabove. In the usual manner, after the wiring device indicated at 29, FIG. 6, has been mounted in the outlet box, the wall plate 28 is fixed to the mounting strap 10 by means of screws 30 extending through apertures in the switch plate 28 and threading into the apertures 15 of the strap 10.

It is of course readily appreciated that the screws 21 are mounted and held captive in the strap 10 during the course of assembly of the strap to the wiring device, and that the devices are shipped to the consumer with the screws thus held captive in the mounting strap. Automatic machinery is readily utilized to insert the screws through the apertures and to move them into position to be captured by the bent-up strips 20 as the machinery causes the bending of the edge portion 18 into the position of FIGURE 4.

Thus the cost of rendering the mounting screws captive is reduced as compared to capturing the screws by the heretofore used method of threading washers onto the rear thereof, while at the same time assuring proper electrical grounding of the mounting strap and the wiring device assembled thereto when installed in an outlet box.

It will also be obvious that although a switch has been indicated in the drawings, other electrical wiring devices such as pilot lights, plug receptacles, dimming switches, etc., may be mounted on similar mounting straps with identical captive screws.

Furthermore, although the mode of capturing a screw has been described in connection with mounting straps for electrical wiring devices, it will be appreciated that the same mode of mounting a screw is applicable in many other situations. Therefore I wish to be limited not by the foregoing description, but on the contrary, solely by the claims granted to me.

What is claimed is:

1. In a mounting means for mounting a wiring device in an outlet box of the type having a mounting strap fixed to the wiring device, and an aperture in said strap positioned to overlie the aperture in at least one of the mounting ears of a standard outlet box; in combination, means holding a mounting screw captive in at least one aperture of the strap, said means comprising a U-shaped strip bent up from the mounting strap adjacent said screw, one end of the screw having a head and a flat disc integral with said screw head and means holding said screw in position in the aperture with a portion of the face of said disc extending beneath said bent-up strip, the lower surface of said disc bearing against the free portion of the mounting strap.

2. In a mounting means for mounting a wiring device in an outlet box of the type having a mounting strap fixed to the wiring device, and an aperture in said strap positioned to overlie the aperture in at least one of the mounting ears of a standard outlet box; in combination, means holding a mounting screw captive in each aperture of the strap, said means comprising a U-shaped strip bent up from the mounting strap adjacent said screw, one end of the screw having a head and a flat disc integral with said screw head and means holding said screw in position in the aperture with a portion of the face of said disc extending beneath said bent-up strip, the lower surface of said disc bearing against the free portion of the mounting strap.

References Cited
UNITED STATES PATENTS

| | | | |
|---|---|---|---|
| 1,807,410 | 5/1931 | Hubbard | 174—57 |
| 3,059,045 | 10/1962 | Swartwood | 174—53 |

LARAMIE E. ASKIN, *Primary Examiner.*

D. A. TONE, *Assistant Examiner.*